United States Patent
Schattney et al.

[11] Patent Number: 5,968,421
[45] Date of Patent: Oct. 19, 1999

[54] PROCESS TO ENRICH A GAS IN A LIQUID

[75] Inventors: Stephan Schattney, Krefeld; Hans-Josef Beutler, Wachtendonk; Michael Frieges, Dusseldorf; Arno Knapp, Toentsvorst, all of Germany

[73] Assignee: Messer Griesheim GmbH, Germany

[21] Appl. No.: 08/821,810

[22] Filed: Mar. 21, 1997

[30]     Foreign Application Priority Data

Mar. 21, 1996 [DE]  Germany ............................ 196 11 093

[51] Int. Cl.⁶ ........................................................ B01F 3/04
[52] U.S. Cl. ............................... 261/49; 261/67; 261/115; 261/119.1
[58] Field of Search ................................. 261/66, 67, 115, 261/119.1, 42, 43, 49

[56]             References Cited

U.S. PATENT DOCUMENTS

| 486,150 | 11/1892 | Wilder | 261/115 |
|---|---|---|---|
| 2,636,721 | 4/1953 | Spining | 261/115 |
| 2,790,307 | 4/1957 | Ayres | 261/115 |
| 3,048,957 | 8/1962 | Middleton | 261/67 |
| 3,172,736 | 3/1965 | Gee et al. | 261/115 |
| 3,265,122 | 8/1966 | Ostrander | 261/115 |
| 4,990,167 | 2/1991 | Stehning | 261/115 |

*Primary Examiner*—C. Scott Bushey
*Attorney, Agent, or Firm*—Connolly Bove Lodge & Hutz LLP

[57]              ABSTRACT

Liquid is sprayed in two partial streams into a tank filled with a gas atmosphere and collects at the bottom of the tank. One partial stream sprayed into the atmosphere prevalent collects at the bottom of the tank. At least one other partial stream is fed into the liquid collected at the bottom of the tank. The partial streams are withdrawn from a shared liquid supply.

13 Claims, 3 Drawing Sheets

5,968,421

PROCESS TO ENRICH A GAS IN A LIQUID

BACKGROUND OF THE INVENTION

The present invention relates to a process to enrich a gas in a liquid as well as to a device suitable for carrying out this process.

According to the state of the art, gases which are to be dissolved in liquids are fed by means of injection nozzles into a liquid volume or into the stream of a liquid. It is also a known procedure to feed gases via perforated hoses which are arranged under the water, applying a defined pressure of the gas to the hoses.

According to another method, a spraying head is employed to spray the water into a volume of a gas atmosphere that is sealed off from the environment, a process in which the drops of water are in a dissolution equilibrium with the gas phase prevalent around them. The water absorbs the gas and collects at the bottom of the tank from where it can be withdrawn for further utilization.

Such processes are employed, for example, to enrich water with oxygen when the water enriched with oxygen is to be used for on-site clean-up of soil contaminated with remnant pollutants. With these types of on-site clean-up operations, the enriched water is injected into the soil. The injection into the soil, however, is preceded by other water preparation processes. Thus, for instance, the water employed for on-site clean-up passes through biological filters and chemical treatment stages which serve to optimize the composition of the water utilized for the on-site clean-up. The water that is thus incorporated into the soil is removed again at another site and then fed to a circulation process for renewed enrichment with oxygen and of chemical-biological treatment.

In order to achieve optimum functioning of an on-site clean-up system as well as to achieve optimum clean-up results, it is necessary to ensure an oxygen concentration in the water which can fulfill the technical requirements. In this manner, downstream stages of a water-treatment installation, for instance, operate with fewer malfunctions if an oxygen concentration is maintained which lies below the saturation value at an operating pressure that is above atmospheric pressure.

The pressure or throughput volume with which the cartridges and filters are operated must also be adapted to the requirements at hand. Since the oxygen atmosphere of the tank through which the water to be enriched trickles is constantly losing oxygen during the enrichment process, the tank must be charged with an overpressure in order to ensure a continuous feed of oxygen into the water as well as to prevent a backflow of the water.

If oxygen is fed by means of injection nozzles into the water to be used for on-site clean-up, excess oxygen escapes into the environment and must then be returned to the oxygen tank via circulation systems, or else it must be disposed of as waste gas since it is loaded with pollutants as the result of its flowing through the circulation system. The use of perforated hoses is not very suitable because they have to be laid flat for purposes of gassing in order to prevent a fusing of the individual gas bubbles. For this reason, this method requires a great deal of space.

The use of tanks charged with an oxygen atmosphere and fitted with a spraying head which atomizes the water to be enriched with oxygen in the tank regularly leads to saturation of the water with oxygen. Thus, it is not possible to regulate the oxygen concentration in the water to concentrations below the saturation value at atmospheric pressure.

In order to achieve the water pressure needed for the operation of the installation, the oxygen pressure above the water level must be kept at such a value that there is an over-saturation— relative to the atmospheric pressure—of the water with oxygen which exceeds the concentration that is acceptable for the overall process.

SUMMARY OF THE INVENTION

Therefore, the invention has the objective of creating a process and a device of the type mentioned above, with which oxygen can be dissolved at a desired concentration in water, a process in which it should be possible to set the oxygen concentration very precisely, irrespective of the throughput volume of the water or of the internal pressure of the tank, so that the tank internal pressure is available as an adjustable parameter employed to maintain other control systems.

With the process and device according to the invention, it is now possible to enrich water with oxygen in tanks at a defined concentration, independent of the throughput volume of water and of the internal pressure of the tank, which can be selected and set at will.

THE DRAWINGS

DETAILED DESCRIPTION

Figure 1:
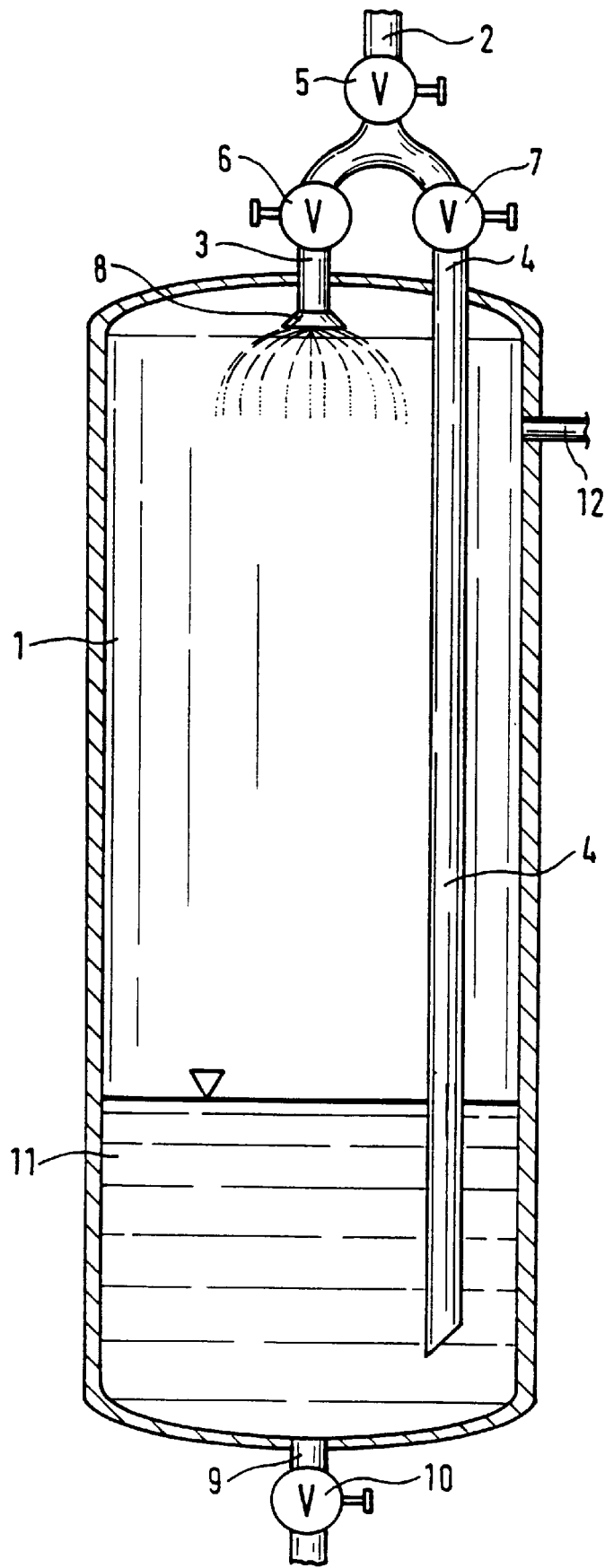
FIG. 1 illustrates a device to carry out the process according to the invention in schematic form.

FIG. 1 shows a tank 1 in the form of a precipitation column into which a line 2 is inserted which splits off into lines 3 and 4. Controllable metering valves 5, 6 and 7 are affixed to lines 2, 3 and 4. Line 3 opens into a spraying device 8 while line 4 is inserted all the way down into the bottom area of the tank 1. At the bottom end of the tank 1, there is a discharge line 9 which is fitted with a valve 10. The tank 1 is filled with water 11. The tank has a connection piece 12 which is connected to a source of oxygen not shown in the drawing.

During operation, the tank 1 depicted in FIG. 1 is connected to an installation employed for on-site clean-up operations. The tank is charged with an oxygen atmosphere having a freely selectable pressure and it is then filled with water via line 2. The water stream of line 2 can be divided into partial streams by means of metering valves 5, 6 and 7, whereby these partial streams are at a defined quantity ratio with respect to each other. The partial stream, which is conveyed through line 3, opens into a spraying device 8, is injected into the tank 1 that is charged with oxygen and collects at the bottom of the tank. During this process, the water is enriched with oxygen. The spraying device 8 is preferably designed as a selfcleaning nozzle, although it can also consist of a perforated plate. The second partial stream flows through line 4—which is fitted with the metering valve 7—into the bottom part of tank 1. This is done in such a way that the water fed through line 4 only exits tank 1 near the bottom of the tank, so that this volume stream does not traverse any segment that is in contact with the oxygen atmosphere. In this manner, this partial stream is not enriched with oxygen. It blends with the water saturated with oxygen at the bottom collection area and, together with this water, forms a mixture having a concentration that is determined by the freely selectable quantity ratio of the partial stream of lines 3 and 4. With this approach, it is possible to establish an oxygen concentration ranging from 5 to 40 mg/l, irrespective of the internal pressure of the tank and irrespective of the throughput flow, which is particularly advantageous for clean-up purposes.

The mixture of partial streams is withdrawn via the discharge line 9 which has a valve 10 and then conveyed to a biological filter as well as to chemical treatment before it is returned for further use.

Line 4 does not have to run through the inside of the tank. It can also run outside of the tank 1 in the form of a bypass; the only relevant aspect is that the partial stream that flows through line 4 into the bottom part of the tank 1 must enter the water that is enriched with oxygen without much turbulence. As a result, the surface of the water level is kept calm, thus preventing an enlargement of its surface. This largely prevents an additional enrichment of the water with oxygen.

Figure 2:
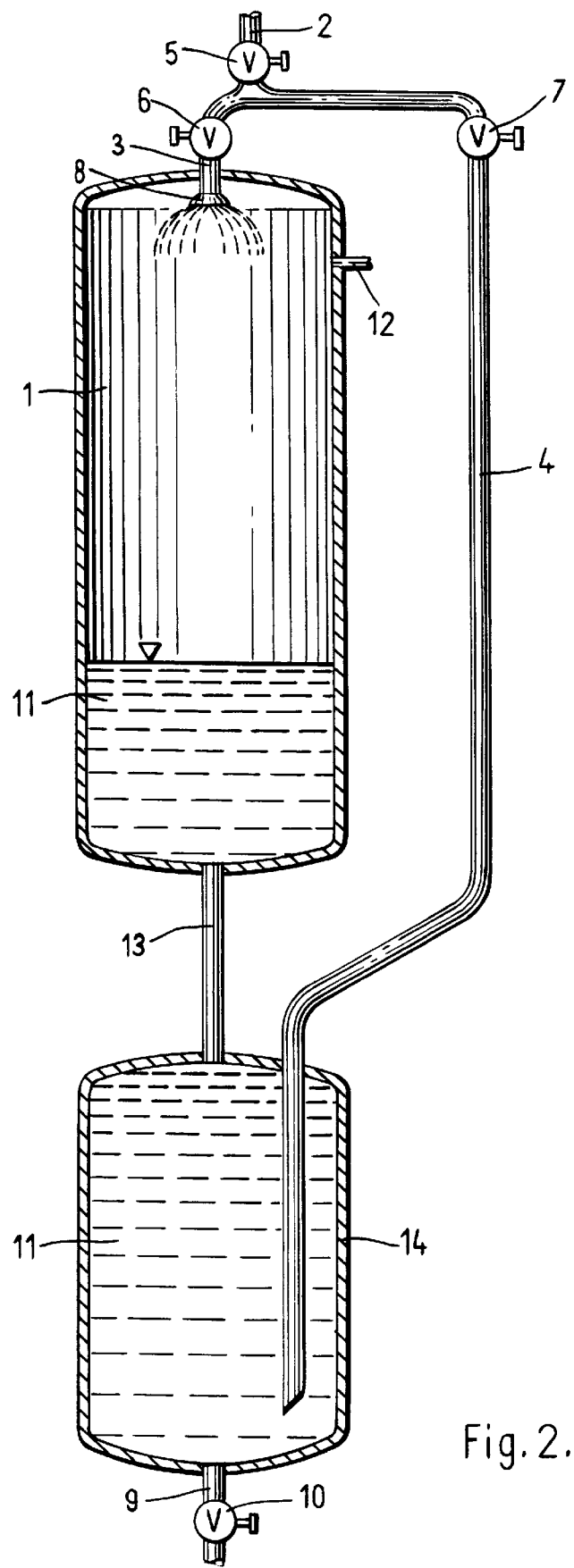
FIGS. 2 and 3 illustrate variations of the device of FIG. 1.

If the water enriched with a defined concentration of oxygen is to be protected against the dissolving of additional oxygen which is located in the headroom of tank 1 and which is in a state of equilibrium with the surface of the water located at the bottom, it is possible to separate the bottom part of tank 1 from the spraying segment, that is to say, from the headroom into which the water is sprayed by means of the spraying device 8; this is achieved by means of a separate tank into which line 4 is then inserted. FIG. 2 illustrates this embodiment where the line 4 extends to a separate tank 14. Tank 14 communicates with tank 1 by line 13. In an advantageous embodiment of the process and device according to the invention, it is possible to employ an electronic regulation means to adjust the throughput volume of water and the quantity ratios of the partial streams as well as the oxygen pressure in tank 1 to the requirements on hand. Thus, for example, throughput flow meters can be employed to determine the consumption rates of oxygen-enriched water which leaves tank 1 through discharge line 9 and then to regulate the feed of fresh water via valve 5 of line 2. Analogously, the release of water enriched with oxygen through discharge line 9 is controlled by automatically regulating the cross section of the opening of valve 10 in that a consumption metering device transmits measured values to a regulation unit. If an oxygen sensor detects a higher oxygen demand, valves 6 and 7 of lines 3 and 4 can be set at a different opening ratio with respect to each other. The oxygen pressure can likewise be controlled. It is also possible to activate the feed of water alternately through line 3 or line 4.

Figure 3:
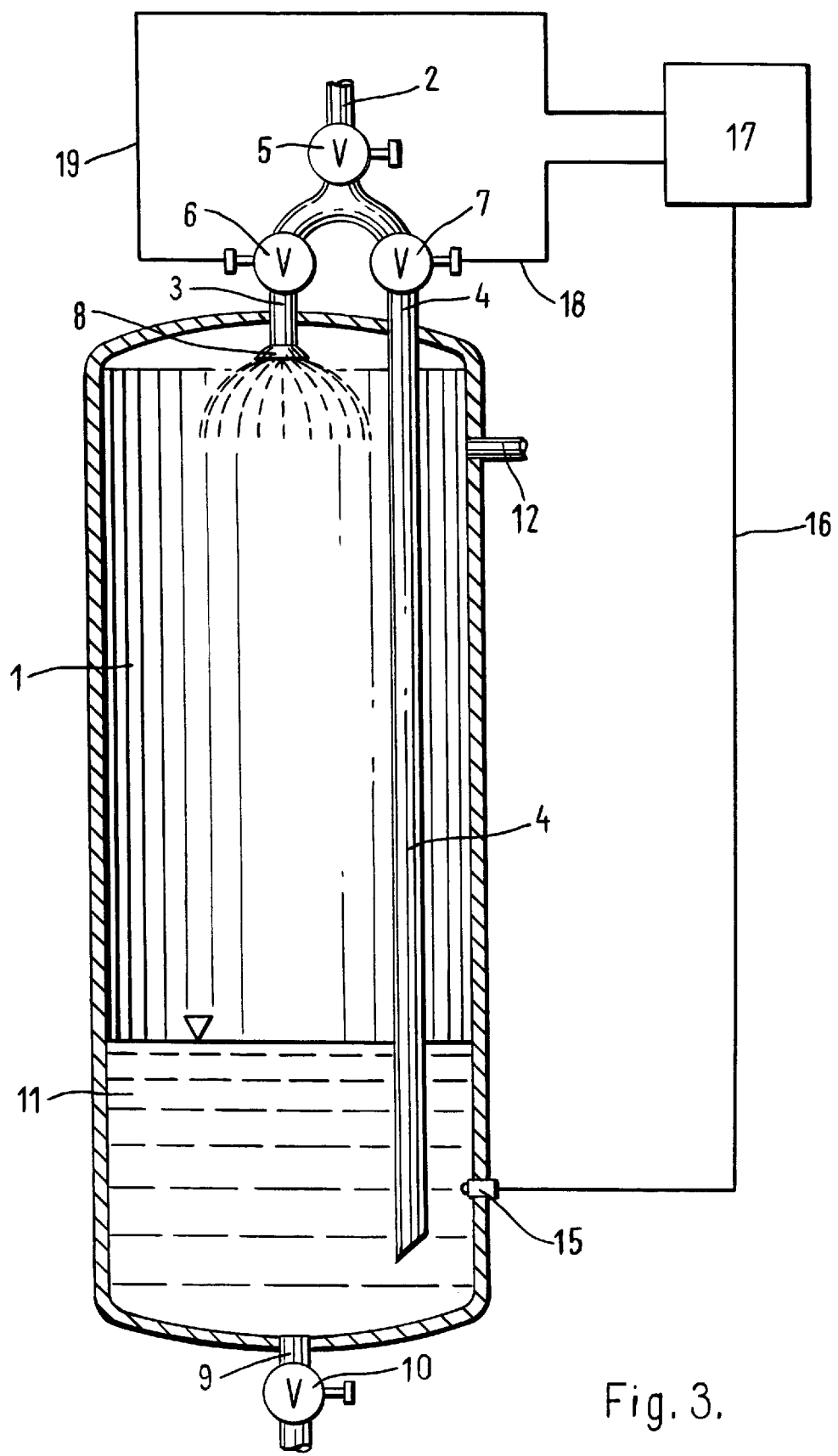

FIG. 3 illustrates a variation where a sensor 15 transmits the measured signal to a control unit 17 by line 16. The control unit 17 actuates the valves 6 and 7 by lines 19 and 18, respectively, so that a ratio of the partial streams is established which leads to the desired concentration when the partial streams are combined. When the control unit receives the signal, the measured value deviating from the target value thereby actuates the valves 6,7.

With the process and device according to the invention, it is now possible to mix water with a defined amount of oxygen without any oxygen loss, whereby the water can be enriched with oxygen in a manner that is independent of the internal pressure of tank 1 as well as independent of the throughput volume of water. The optimum oxygen content and operating pressure necessary for the operation of biological filters and chemical treatment stages can be generated without great effort. This prevents loss of oxygen caused by out-gassing of the oxygen due to oversaturation when it is reduced to atmospheric pressure. In this manner, the formation of bubbles in the cartridges and filters due to pressure fluctuations can also be avoided. The process and device according to the invention are particularly advantageous when the operating pressure and thus the internal pressure of tank 1 have to be kept constant for technical reasons since, in such cases, the conventional method does not permit the use of the oxygen pressure in tank 1 for purposes of setting the oxygen concentration via the partial pressure and for setting the oxygen concentration in the water which is at a state of equilibrium with the partial pressure. Therefore, according to the invention, the incorporation of oxygen into the water can be dissociated from the internal pressure of the pressurized tank, so that the internal pressure of the tank continues to be available as an adjustable parameter for other control systems. The maximum possible oxygen concentration for saturation at atmospheric pressure, namely, approximately 40 mg/l, is low relative to the theoretical solubility of technical oxygen under pressure. The process and device according to the invention are not restricted only to enriching water with oxygen or to applications in the clean-up sector; on the contrary, any solvent can be enriched with a gas that is soluble in this solvent and employed for other purposes.

We claim:

1. In a process to enrich a gas in a liquid, in which the liquid is sprayed into a tank filled with the atmosphere of the gas and collects at the bottom of the tank, the improvement being in that the liquid is conveyed in at least two partial streams, of which at least one partial stream is sprayed into the atmosphere prevalent in the tank and collects at the bottom of the tank, and at least one other partial stream is fed into the liquid that has collected at the bottom of the tank, a process in which the at least one other partial stream does not come into contact with the gas atmosphere, including the quantity ratio of the partial stream being varied, so that, when the partial streams meet at the bottom of the tank, they give rise to a freely selectable gas concentration in the liquid mixture, and the partial streams are withdrawn from a shared liquid supply.

2. Process according to claim 1, characterized in that the partial streams are combined at the bottom of the tank in a way that they do not give rise to much turbulence.

3. Process according to claim 2, characterized in that the partial streams are combined in a separate tank.

4. Process according to claim 1, characterized in the that oxygen is used as the gas.

5. Process according to claim 1, characterized in that the liquid mixture which is made up of the partial streams and which collects at the bottom of the tank has a concentration of oxygen in the water ranging from 5 to 40 mg/l.

6. In a process to enrich a gas in a liquid, in which the liquid is sprayed into a tank filled with the atmosphere of the gas and collects at the bottom of the tank, the improvement being in that the liquid is conveyed in at least two partial streams, of which at least one partial stream is sprayed into the atmosphere prevalent in the tank and collects at the bottom of the tank, and at least one other partial stream is fed into the liquid that has collected at the bottom of the tank, a process in which the at least one other partial stream does not come into contact with the gas atmosphere, and the gas concentration of the liquid collected at the bottom of the tank is measured by means of a sensor which transmits the measured signal to a control unit which upon the measured value deviating from the target value actuates a pair of valves in such a way that a ratio of the partial streams is established which leads to the desired concentration when the partial streams are combined.

7. Process according to claim 6, characterized in that oxygen is used as the gas.

8. Process according to claim 7, characterized in that water is used as the liquid.

9. Process according to claim 8, characterized in that the liquid mixture which is made up of the partial streams and which collects at the bottom of the tank has a concentration of oxygen in the water ranging from 5 to 40 mg/l.

10. Process according to claim 7, characterized in that the liquid mixture which is made up of the partial streams and which collects at the bottom of the tank has a concentration of oxygen in the water ranging from 5 to 40 mg/l.

11. Process according to claim 6, characterized in that the partial streams are withdrawn from a shared liquid supply.

12. Process according to claim 11, characterized in that the partial streams are combined at the bottom of the tank in a way that they do not give rise to much turbulence.

13. Process according to claim 6, characterized in that the partial streams are combined in a separate tank.

* * * * *